United States Patent [19]

Bender et al.

[11] 4,034,711
[45] July 12, 1977

[54] MOBILE MILK UNIT AND SYSTEM

[75] Inventors: Lloyd F. Bender; Rolyn A. Schmid, both of Hayward, Wis.

[73] Assignee: Bender Machine Works, Inc., Hayward, Wis.

[21] Appl. No.: 600,813

[22] Filed: July 31, 1975

[51] Int. Cl.² ............................................ A01J 5/00
[52] U.S. Cl. ........................ 119/14.11; 119/14.05; 119/14.46
[58] Field of Search ......... 119/14.11, 14.14, 14.05, 119/14.46, 14.07, 14.28, 14.39, 14.4, 14.41, 14.43, 14.08

[56] References Cited

U.S. PATENT DOCUMENTS

| 3,019,764 | 2/1962 | Schilling | 119/14.05 |
| 3,117,553 | 1/1964 | Dujardin et al. | 119/14.39 |
| 3,385,265 | 5/1968 | Schrader | 119/14.11 |
| 3,469,596 | 9/1969 | Branton | 119/14.43 |
| 3,878,819 | 4/1975 | Harman | 119/14.14 |

Primary Examiner—John F. Pitrelli
Assistant Examiner—Peter K. Skiff
Attorney, Agent, or Firm—James E. Nilles

[57] ABSTRACT

A mobile, complete milking unit for milking cows and transferring the milk to a storage tank, the unit having all the milk handling components mounted thereon as an integral, portable unit. The unit can be moved about in the milking area whether it is in the barn, in the barn yard, or in the field.

4 Claims, 6 Drawing Figures

MOBILE MILK UNIT AND SYSTEM

BACKGROUND OF THE INVENTION

This invention pertains generally to dairy equipment and more particularly to milking apparatus for milking cows and conveying the milk to a storage tank. Apparatus of this general character is shown in several United States patents where the milk lines, receivers, and control equipment are secured in the milking parlor and/or in the milk room. These installations are permanent and generally quite expensive due to the milk lines and other apparatus which is required and furthermore these prior art apparatus are inflexible, somewhat inefficient, and expensive to produce and maintain. Examples of such prior art apparatus is shown in U.S. Pat. Nos. 3,273,514 which issued Sept. 20, 1966 and entitled "Fluid Conveying Apparatus"; 3,310,061 which issued Mar. 21, 1967 and entitled "Milk Line Equipment"; 3,352,248 which issued Nov. 14, 1967 and entitled "Fluid Conveying Apparatus"; 3,531,217 which issued Sept. 27, 1970 entitled "Vacuum Operated Timing Device for Fluid Conveying Apparatus"; and U.S. Pat. 3,658,441 issued Apr. 25, 1972 entitled "Fluid Line Releaser and Washer".

SUMMARY OF THE INVENTION

The present invention provides a mobile, complete milking unit for milking cows, collecting the milk, and periodically transferring the collected milk to a storage tank, all of which is accomplished in an automatic and timed manner. The portable unit can be used in the barn where the cows are brought to be milked or the unit may be transported to the barn yard or out in the field where the cows are located, thus avoiding the necessity of bringing the cows into the barn or into a particular milking area and the latter procedure is especially desirable in countries or climates where such a system lends itself to that method of milking.

The mobile milking unit contemplated by the present invention can be mounted on a portable cart having ground engaging wheels, it can be mounted on an overhead trolley for being moved along a milking parlor, or it can be mounted on a self-propelled vehicle, such as a truck, the truck having an internal combustion engine for driving a generator and which thus provides the necessary electrical energy.

The invention provides electrical control means for periodically conveying the collected milk from a milk receiver and to the bulk storage tank.

The present invention provides a highly efficient and complete milking unit which operates with no loss or milk and is otherwise efficient in operation; it is sanitary and complies with the various sanitation codes; it is flexible in operation and requires no permanently attached milk lines or other components which would otherwise limit its use.

These and other objects and advantages of the present invention will appear hereinafter as this disclosure progresses, reference being had to the accompanying drawings.

DESCRIPTION OF THE PREFERRED EMBODIMENT

Figure 1:
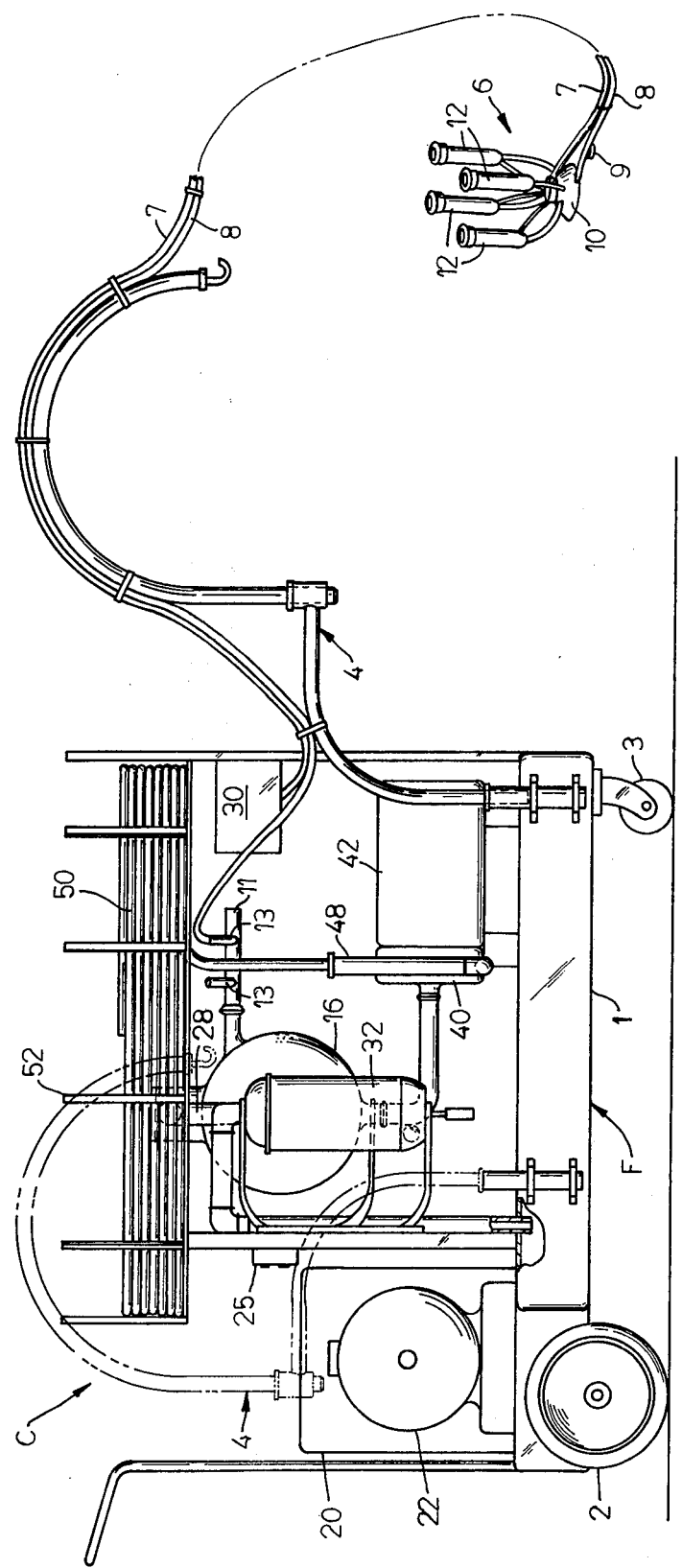
FIG. 1 is a side elevational view of one embodiment of the invention and showing it as applied to a portable, manually pushed cart having the necessary ground wheels.
Figure 2:
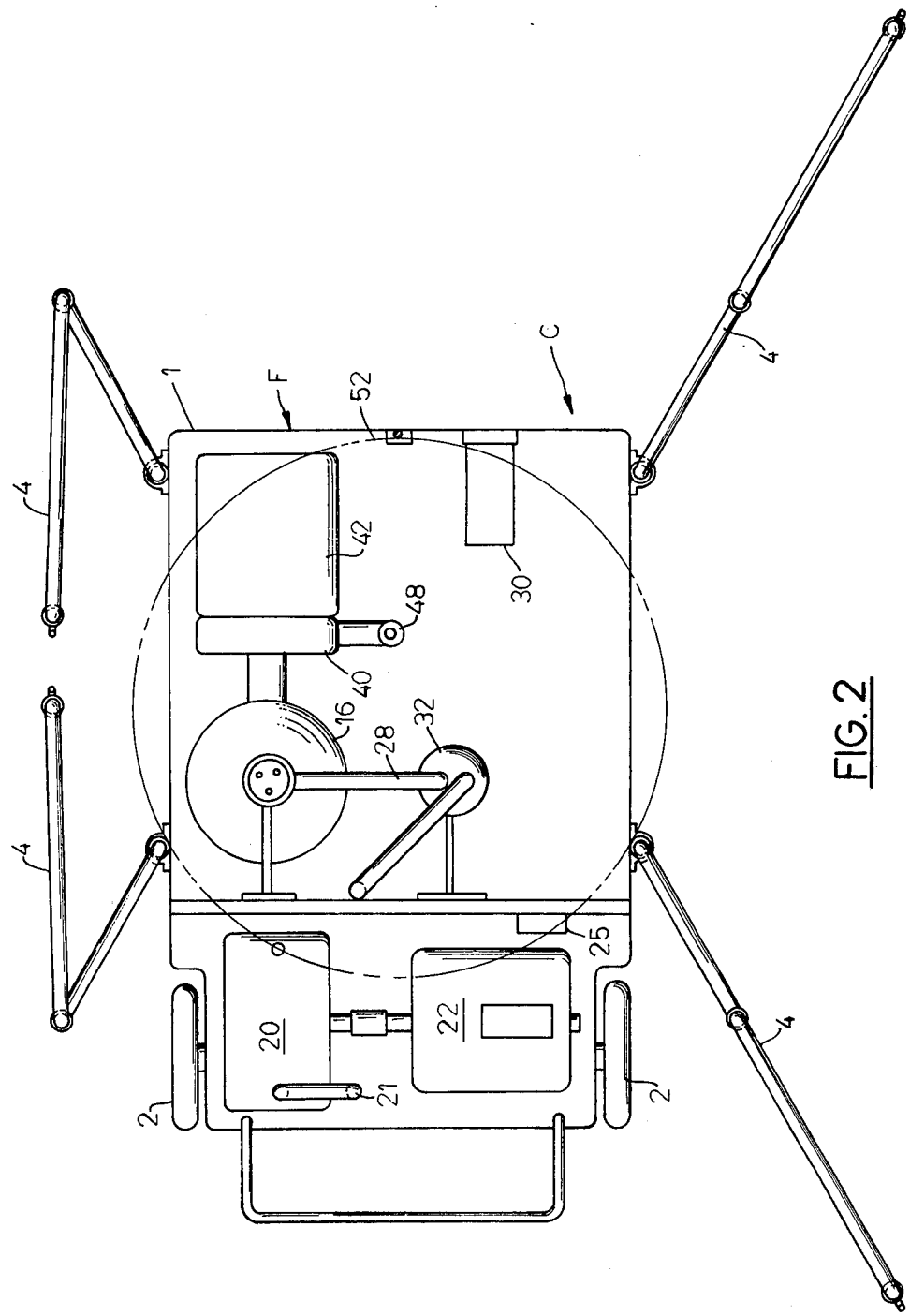
FIG. 2 is a plan view of the portable unit shown in FIG. 1, certain parts being removed for the sake of clarity.
Figure 3:
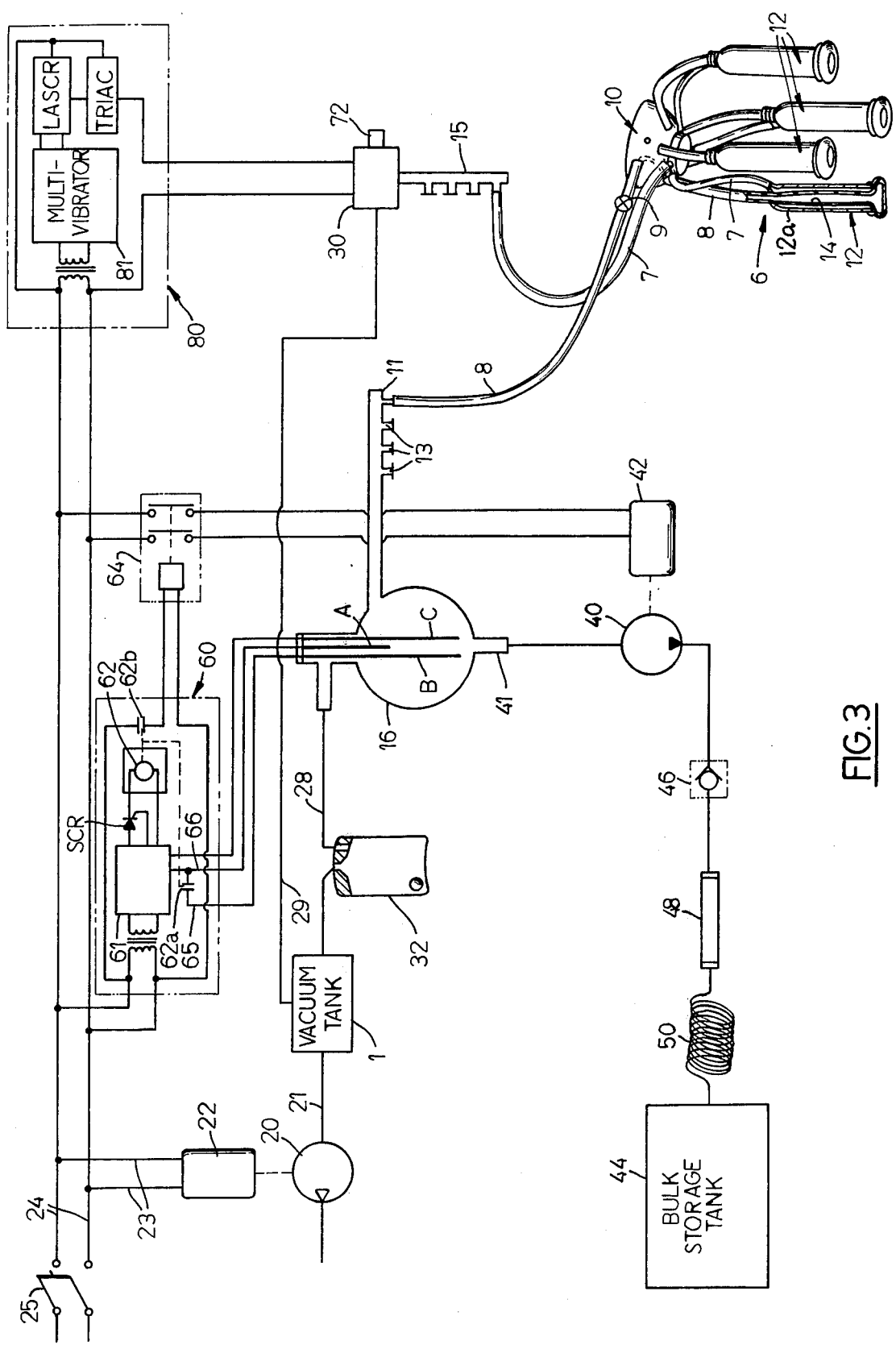
FIG. 3 is a schematic diagram of certain of the parts shown in FIGS. 1 and 2 and also including an electric control circuit and components for the various parts.

As shown in FIGS. 1, 2 and 3, the mobile unit is in the form of a cart C, having a mobile frame F which is generally comprised of a steel vacuum tank 1 which acts as a base of the unit and to which are attached a pair of rubber tired wheels 2 and caster wheel means 3. The mobile frame also has a series, for example four, of swing arms 4 swingably mounted thereon. Any number of swing arms can be mounted on the frame and each is adapted to support a conventional teat claw 6 and the flexible lines 7 and 8 extending therefrom. Line 8 is a lower vacuum line having an on/off valve 9, and extends from the interior liner 14 of the teat cups 12 through an enclosed pan 10 of the claw, and to a receiver manifold 11. Only one such teat claw has been illustrated in FIGS. 1 and 3, but it is understood that other numbers can also be simultaneously used and the manifold 11 has a series of attached nipples 13 for the reception of said other vacuum lines and claw assemblies.

The mobile frame also has a milk receiver 16 mounted thereon and this milk receiver is generally formed of transparent material such as glass and acts to receive the milk from the teat claw assemblies 6. Vacuum means are provided for continually drawing a vacuum in the interior of the receiver 16 and this vacuum means includes a vacuum pump 20 which is connected via line 21 to the vacuum tank 1. The vacuum pump is driven by the pump motor 22 which in turn is connected by electrical lines 23 with the electric power lines 24. Power lines 24 are connected via an on/off switch 25 to an electrical source, not shown. The vacuum tank is connected by vacuum conduits 28 and 29, respectively, to the receiver 16 and to a solenoid pulsator 30 to be later referred to. The vacuum pump is continually operated to produce a vacuum in the tank 1 which thus in turn continually draws a vacuum from the receiver 16, via the moisture trap 32. The vacuum tank also continually draws a vacuum from the solenoid pulsator through line 29.

A milk pump 40 is connected to an outlet 41 of the receiver and is driven by the milk pump electric motor 42. A bulk storage tank 44 is provided and the milk pump periodically is actuated to pump the milk from the receiver 16 through a one-way check valve 46, milk filter 48, and through a flexible tubing 50 and into the bulk storage tank. The flexible tubing 50 is preferably of plastic material and can be coiled for storage on the flexible tubing storage frame 52 which is carried by the mobile frame. As the mobile frame is moved from one milking area to another, the coil of flexible tubing 50 is unwound so that the unit can convey the milk to the bulk storage tank 44 which can be located elsewhere.

Means are provided in the receiver 16 for sensing when the receiver is sufficiently full of milk from the claw assemblies so that it should be emptied by actuating the milk pump 40 and pumping the milk from the receiver to the storage tank 44. This milk level sensing means located in the receiver takes the form of three electrical probes A, B and C which extend upwardly therefrom, the bottom end of the probes being located at different levels in the receiver. These probes in turn are connected to milk level control means 60, to be referred to in detail, and which control the milk pump 40 in a timed manner. The milk probes sense the level of the milk, both the low and high extremes thereof in the receiver jar and insure that the receiver will never over-flow and that the milk pump 40 will not be damaged by running dry. The arrangement of the probes is such that when the milk level rises sufficiently in the receiver so as to contact the shortest probe A, the milk level control 60 activates a contacter 64 which closes its normally open contacts to apply electrical energy to the milk pump motor 42 from the lines 24, thus emptying the receiver when the level rises as indicated. More specifically, when milk enters the receiver 16 and submerges the top probe A, enough current flows through the milk to be sensed by a solid state amplifier 61 which provides enough gate signal to trigger a silicon controlled rectifier (SCR). The output of the SCR operates the control relay 62. Once the control relay 62 is activated the SCR and the control relay 62 are latched through closure of the normally open contacts 62a between lines 65 and 66. Activation of control relay 62 effects closure of the normally open contacts 62b to activate the milk pump contactor 64. Probe B extends downwardly in the receiver farther than probe A and when the liquid level falls below this probe B, the milk level control means 60 deenergizes contactor 64 and disconnects the milk pump motor 42 from the lines 24 thereby deenergizing motor 42 and causing the pumping action of the pump 40 to cease, and consequently permitting the receiver 16 to again fill with milk from the continuous vacuum line 8. Probe C is a ground probe. The milk level control 60 may, for example, take the form of a Model LCS10 device manufactured by Curtis Industries, Inc., 8000 West Tower Avenue, Milwaukee, Wisconsin 53223.

Referring to the claw assemblies 6, they are subjected alternately to vacuum and/or atmospheric pressure thereby causing the teat cup liners 14 (FIG. 3) or inflations to open or collapse on the cow's teat in the known manner. Intermitted high vacuum is supplied to the teat cups 12 by the vacuum line 7, which is connected to the manifold 15 of the solenoid 30. When the solenoid permits air to enter the line 7, shutting off vacuum, the air fills the space between the teat cup outer shell 12a and the cup liner and thus causes inflation of the cup to collapse, thereby massaging the teats. When the solenoid applies the high vacuum to line 7, the teat cups are inflated, in the known manner. Conduitsor lines 8 lead directly from the interior of the teat cups 12 that is directly from the teat of the cow and the conduits 8 thus convey the milk to the manifold 11 and thus to the receiver 16. The vacuum in lines 8 is a lower vacuum than that in line 7, all as is conventional, thus milk and vacuum are drawn into the receiver 16.

The pulsator 30 is connected to the pulsator timer 80 which may be operated at 60 cycles per minute and which is in turn connected to the power lines 24. The pulsator timer 80 has a 60–40 duty cycle alternating vacuum and atmospheric pressure. The purpose of the pulsator timer 80 is to control the on/off time of the solenoid operated pulsator 30 which in turn alternates between vacuum and atmosphere pressure to effect the teat cup operations as described. The pulsator timer 80 comprises an astable multivibrator (timer) 81 which operates at a frequency of 1 Hz, with 0.6 seconds on time and 0.4 seconds off time. The pulsator timer 80 also includes a light activated silicon control rectifier (LASCR) which is used to provide isolation between the output circuits and the timer circuit so the frequency will stay constant. Additionally, the LASCR provides sufficient gating current to trigger the TRIAC circuit which acts as a single pole normally open relay for controlling the pulsator solenoid 30.

During the 0.6 seconds on time voltage is applied to the three-way solenoid 30 and vacuum is applied via line 7 to the outer side of the teat cup inflator causing them to open and milk flows from the cow's teat. During the 0.4 seconds off time the solenoid 30 reverts to its static condition and allows atmospheric pressure to the other side of the inflator allowing it to collapse and massage the cows' teat. The pulsator timer 80 is a solid state timing device using a three-way solenoid valve.

Figure 4:
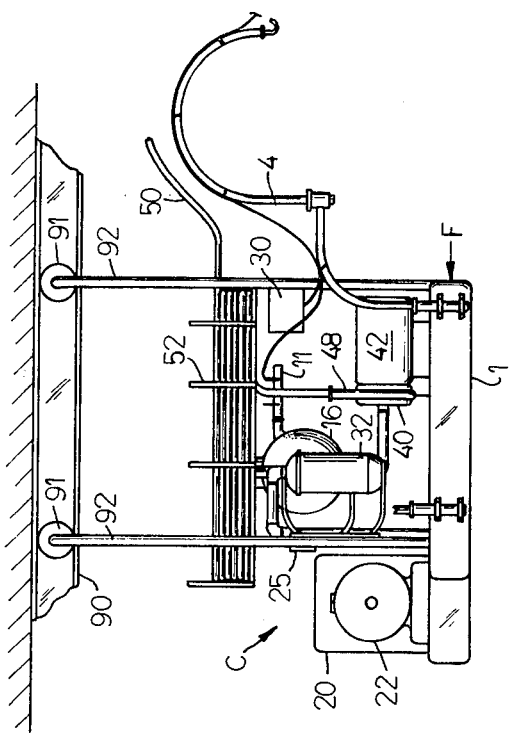
FIGS. 4 and 5 show embodiments of the invention wherein the portable unit is mounted on an overhead track for being conveyed along a milking area, FIG. 4 being an elevational view of the unit and FIG. 5 being another elevational view of the unit and taken generally along the line 4—4 of FIG. 5.
Figure 5:
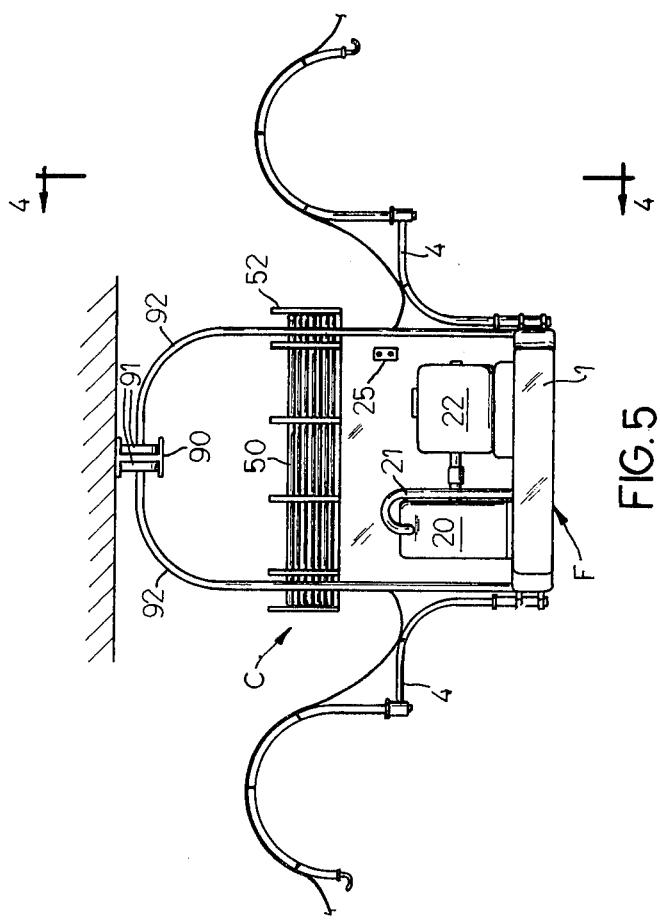

The embodiment of the invention shows in FIGS. 4 and 5 is the same as that shown in connection with FIGS. 1, 2 and 3, except that the mobile frame is mounted as previously indicated on an overhead trolley track 90 by the wheels 91 fixed to the upwardly extending frame members 92. Thus, the mobile frame is suspended for overhead movement rather than movement along the floor.

Figure 6:
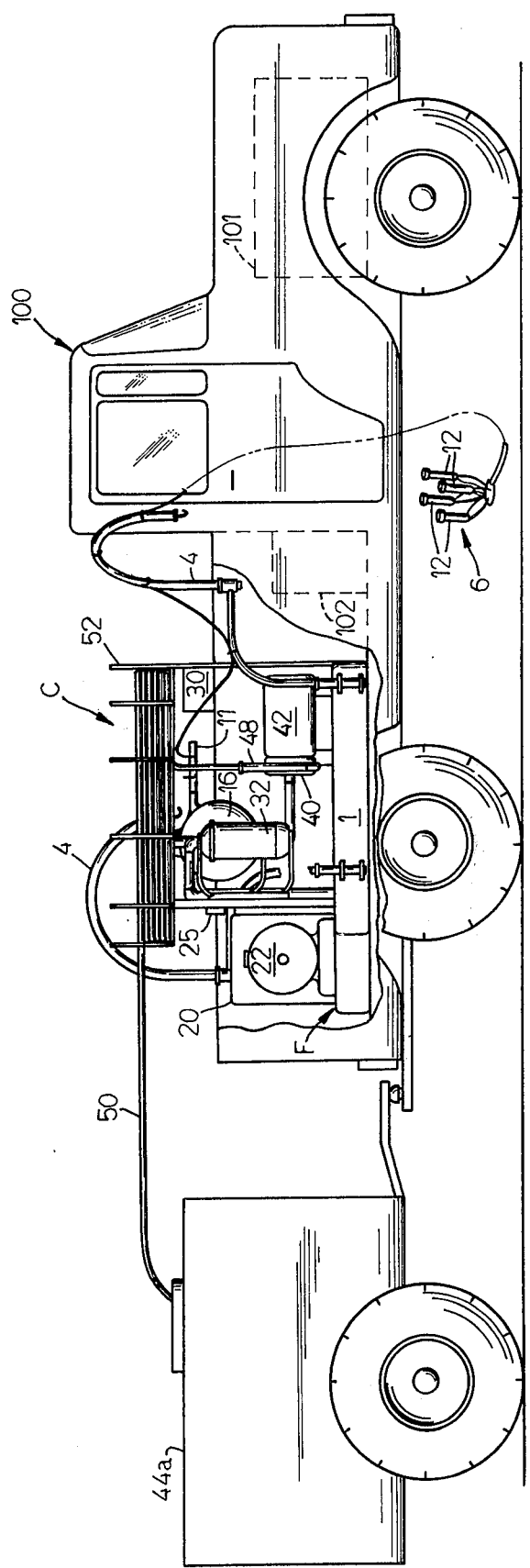
FIG. 6 is another embodiment of the invention and showing the unit as mounted on a self-propelled vehicle, such as a truck and which truck also has a trailer attached thereto containing a storage tank.

FIG. 6 shows another modification wherein the mobile unit is mounted on a self-propelled vehicle, such as a truck 100 which includes an internal combustion engine 101 that drives an electric generator 102. The generator thus acts as a source of electrical energy for the power lines 24. In this modification the storage tank 44a is in the form of a trailer attached to the truck 100. This embodiment of the invention can be used to go out in the field where the cows are located to thereby avoid the necessity of bringing the cows into a particular milking area. Several trailer type storage tanks 44a may be used so that they can be conveyed individually out in the field when they are full.

We claim:

1. A mobile milking unit having components energizable from an electrical power source and for supplying milk to a bulk storage tank remote from said unit comprising: a mobile frame, a single milk receiver, a vacuum pump connected to said receiver for subjecting said receiver to vacuum, a first motor for driving said vacuum pump, means for connecting said first motor to said power source, a plurality of teat claw assemblies, a plurality of adjustably movable swing arms on said frame for supporting said plurality of teat claw assemblies, a plurality of milk conduits, each milk conduit connected for conveying milk from a teat claw assembly to said receiver in response to said vacuum in said receiver, a shut-off valve for each milk conduit for shutting off vacuum to a teat claw assembly not in use, an electrically operated pulsator energizable from said power source and operatively connected to said claw assemblies for selectively connecting said teat claw assemblies to said vacuum pump and to atmosphere to thereby alternately subject said claw assemblies to vacuum or atmosphere, electrically operated milk level sensing means connected to said receiver and energizable from said power source for providing electric signals indicative of milk level, a milk pump connected to said receiver for pumping milk from said receiver to said bulk storage tank, a second motor for driving said milk pump, an electrical contactor energizable from said power source for connecting said second motor to said power source, electrically operated milk level control means energizable from said power source and connected to said electrical contactor and to said milk level sensing means periodically for operating said milk pump to periodically empty said receiver into said bulk storage tank when milk in said receiver reaches a predetermined level as sensed by said milk level sensing means, and electrically operable pulsator timer means energizable from said power source and connected to said pulsator for cyclically energizing said pulsator from said source of power to effect timed control of the pulsations of said pulsator.

2. The unit set forth in claim 1 further characterized in that said milk level control means comprises a relay for operating said contactor, a controlled rectifier for operating said relay, and electric control means for sensing said signals and for operating said controlled rectifier in response thereto.

3. The unit set forth in claim 1 further characterized in that said pulsator comprises a solenoid operated valve and said pulsator timer means comprises a solid state multivibrator to establish an on-off duty cycle at a predetermined frequency, a solid state switch cyclically operated by said multivibrator to effect operation of said solenoid operated valve in said pulsator, and a light actuated control rectifier to isolate said multivibrator from said solid state switch to prevent undesirable frequency changes.

4. A mobile milking unit having components energizable from an electrical power source and for supplying milk to a bulk storage tank remote from said unit comprising: a mobile frame, a single milk receiver, a vacuum pump connected to said receiver for subjecting said receiver to vacuum, a first motor for driving said vacuum pump and connected to said power source, a plurality of teat claw assemblies, a plurality of adjustably movable swing arms on said frame for supporting said plurality of teat claw assemblies, a plurality of milk conduits, each milk conduit connected for conveying milk from one said teat claw assembly to said receiver due to said vacuum in said receiver, a shut-off valve for each milk conduit for shutting off vacuum to a teat claw assembly not in use, a solenoid operated pulsator valve energizable from said power source and operatively connected to said claw assemblies for selectively connecting said teat claw assemblies to said vacuum pump and atmosphere to thereby alternately subject said claw assemblies to vacuum or atmosphere, electrically operated milk level sensing means in said receiver and energizable from said power source for providing electric signals indicative of milk level, a milk pump connected to and for pumping milk from said receiver to said bulk storage tank, a second motor energizable from said power source for driving said milk pump, an electrical contactor for connecting said second motor to said source of power, electrically operated milk level control means energizable from said power source and connected to said contactor and to said milk level sensing means periodically for operating said milk pump to periodically empty said receiver into said bulk storage tank when milk in said receiver reaches a predetermined level as sensed by said milk level sensing means, said milk level control means comprising a relay for operating said contactor, a controlled rectifier for operating said relay, and electric control means for sensing sais signals and for operating said controlled rectifier in response thereto, and electrically operated pulsator timer means connected to said solenoid operated pulsator valve for cyclically energizing said pulsator from said power source to effect timed control of the pulsations of said pulsator valve, said pulsator timer means comprising a solid state multivibrator to establish an on-off duty cycle at a predetermined frequency, and a solid state switch cyclically operated by said multivibrator to effect operation of said solenoid operated pulsator, and a light actuated control rectifier to isolate said multivibrator from said solid state switch to prevent undesirable frequency changes.

* * * * *